United States Patent [19]
Buckley et al.

[11] Patent Number: 6,109,100
[45] Date of Patent: Aug. 29, 2000

[54] PRESSURE-OR FLOW-SENSITIVE FEEDING MONITOR

[76] Inventors: Scott F. Buckley, 2808 SE. 26th Ave., Portland, Oreg. 97202; Neil R. M. Buist, 8510 SW. White Pine La., Portland, Oreg. 97225

[21] Appl. No.: 09/140,634

[22] Filed: Aug. 26, 1998

Related U.S. Application Data

[60] Provisional application No. 60/057,881, Sep. 3, 1997.

[51] Int. Cl.[7] .............................. G01F 15/02; A61M 1/06
[52] U.S. Cl. ................................... 73/198; 73/37; 604/76
[58] Field of Search ..................... 73/37, 426, 864.11, 73/198; 604/76

[56] References Cited

U.S. PATENT DOCUMENTS

| | | | |
|---|---|---|---|
| 2,045,413 | 6/1936 | Rowland | 73/198 |
| 2,118,079 | 5/1938 | Goode et al. | 73/198 |
| 2,205,761 | 6/1940 | Hallberg | 73/198 |
| 3,895,533 | 7/1975 | Steier . | |
| 4,945,771 | 8/1990 | Ogden | 73/198 |

*Primary Examiner*—Harshad Patel
*Attorney, Agent, or Firm*—Stoel Rives LLP

[57] ABSTRACT

A feeding monitor system provides data responsive to a human or animal subject sucking on a nipple or other outlet connected to a supply of feeding fluid stored in a reservoir. A hollow chamber provided in between the reservoir and the outlet includes a pressure sensor and/or a fluid flow meter to provide electronic monitoring signals. These signals can be amplified or otherwise conditioned for display, transmission or storage, e.g. in digital form. The invention has wide application, including without limitation use in a neo-natal intensive care environment for diagnosis and screening of disease and disability, assessment of different feeding systems including nipple characteristics, gauging strength and oropharyngeal function, and evaluating response to therapy for feeding difficulties of infants.

20 Claims, 3 Drawing Sheets

PRESSURE- OR FLOW-SENSITIVE FEEDING MONITOR

RELATED APPLICATION

This application is a continuation of application Ser. No. 60/057,881 filed Sep. 3, 1997.

BACKGROUND OF THE INVENTION

Field of the Invention

The present invention pertains to monitoring the ingestion of fluids by a human or animal subject and, more specifically, is directed to monitoring sucking force applied by the subject for use in gauging the subject's strength, growth or general health.

SUMMARY OF THE INVENTION

The present invention provides detailed information about human or animal feeding or drinking and provides information about feeding and drinking strength, ability and behavior. Although it can be used to study feeding and drinking in organisms of any age, it is particularly well-suited for monitoring and evaluating the feeding and oropharyngeal function of infants.

Thus one important application of the invention is for monitoring human infant feeding, especially in those with dysfunctional feeding behavior including undersized or premature infants. The invention can be applied at home or in medical settings such as the neo-natal intensive care unit of a hospital. The invention can be used in medical research, patient assessment screening, or in more pedestrian applications such as automatically alerting a parent when a toddler's bottle has run dry. The invention can also be used for assessment of different feeding systems including nipple characteristics.

In one embodiment, the invention comprises an infant feeding monitor system that includes a reservoir for storing a supply of a fluid more dense than air, for example a liquid or semi-liquid drink or formula. A hollow chamber further described below has first and second open ends to allow the fluid to pass therethrough in use, the first end of the chamber being connected to the reservoir to receive the fluid. An outlet is connected to the second end of the chamber to allow the fluid to flow through the outlet responsive to a vacuum or sucking force applied to the outlet, and a pressure sensor is coupled to the chamber for monitoring pressure within the chamber.

In one arrangement, the reservoir includes an internal collapsible bag for storing the fluid, thereby allowing the fluid to be drawn out of the reservoir and into the chamber without introducing air into the fluid. In an alternative arrangement, the reservoir is formed of a rigid material, for example a substantially transparent polymeric material like a common baby bottle, a first end of the reservoir being connected to communicate with the first end of the chamber, and further including a gas permeable membrane arranged in the opposite end of the reservoir so as to allow air to be drawn into the reservoir, thereby allowing the fluid to flow out of the first end of the reservoir and into the chamber responsive to the vacuum force applied at the outlet. The chamber itself can be sized so as to restrict fluid flow from the reservoir. Alternatively, a connecting tube is connected in between the reservoir and the chamber so that fluid drawn from the reservoir flows through the connecting tube into the chamber, and a flow restriction means can be provided in the connecting tube for restricting flow of the fluid into the chamber.

The preferred system additionally includes an amplifier connected to the pressure sensor to amplify electronic signals provided by the pressure sensor responsive to pressure in the chamber, so as to form output signals. The resulting output signals can be displayed, recorded, stored on a computer disk, etc.

Another aspect of the invention is a method for monitoring feeding, comprising the steps of: providing a reservoir containing a supply of a feeding fluid; arranging a chamber between the reservoir and the subject so that the feeding fluid flows through the chamber in response to sucking pressure applied by the subject while ingesting the feeding fluid; and monitoring pressure in the chamber while the subject ingests the feeding fluid. A still further aspect of the invention comprises an analogous methodology in which fluid flow rather than pressure is monitored in the chamber. Pressure and fluid flow measurements may be combined in one apparatus.

The foregoing and other objects, features and advantages of the invention will become more readily apparent from the following detailed description of preferred embodiments, which proceeds with reference to the drawings.

DETAILED DESCRIPTION OF THE PREFERRED EMBODIMENTS

Figure 1:
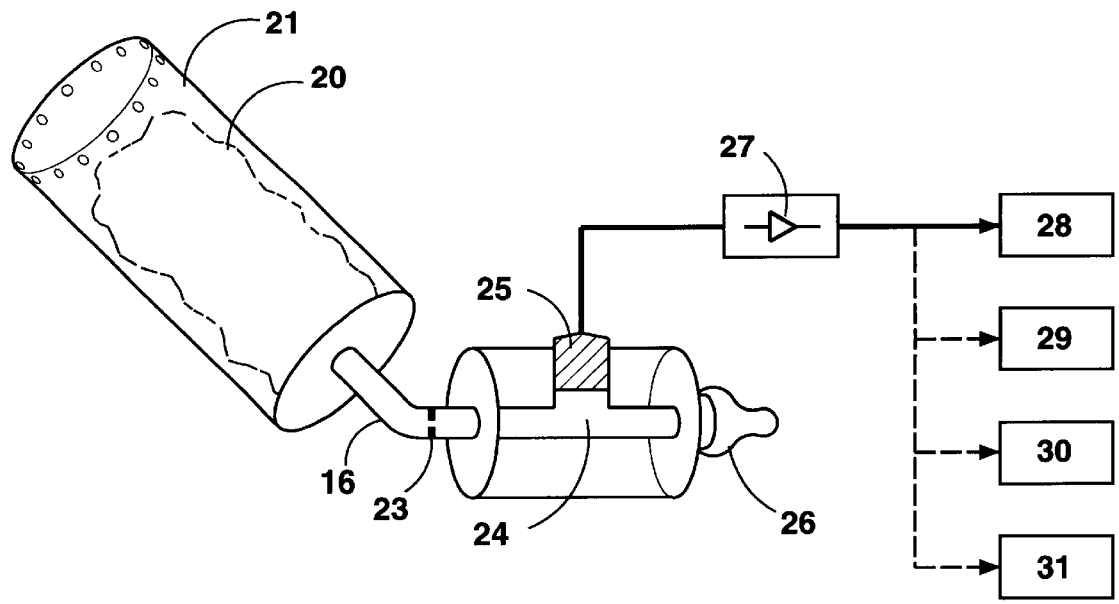
FIG. 1 is an overall view of the pressure-sensing system.

This invention has two main embodiments: a pressure-sensing embodiment (embodiment 1), and a flow-sensing embodiment (embodiment 2). An overall view of the pressure-sensing embodiment is shown in FIG. 1.

A flow chamber 24, which may be constructed in a variety of sizes or shapes from any suitable material, houses a pressure sensor 25. A reservoir 21 contains liquid or semi-liquid nutrient (including but not limited to water, milk, infant formula, specialty formulas, etc.). The device is constructed so that liquids or semi-liquids can pass through a flow restriction orifice 23 and chamber 24 to an outlet 26. The flow restriction upstream of the chamber is preferred to ensure adequate pressure drop in the chamber responsive to sucking at the outlet. For water, a flow restriction bore of around 10–15 mils diameter works well and still allows adequate flow rate of the fluid. A slightly larger bore, say 20 mils, is useful for more viscous fluids such as baby formulae to allow good flow rate while still providing sufficient pressure differential to ensure accurate monitoring. Attached to outlet 26 may be a nipple, drinking tube, or any other means of supplying liquid or semi-liquid food to a human or animal.

The electrical output of pressure sensor 25 is conditioned by an amplifier/signal conditioner 27 and the resulting signal may be recorded or displayed at devices such as (but not limited to): a chart recorder 28, an analog/digital converter 29, a data recorder 30, or a computer or other data storage or processing device 31. Various pressure sensors, signal conditioners, recorders, ADCs and similar devices and circuits to sense and record pressure changes are well known in other contexts, so details are omitted here. Such devices are widely commercially available.

Figure 2:
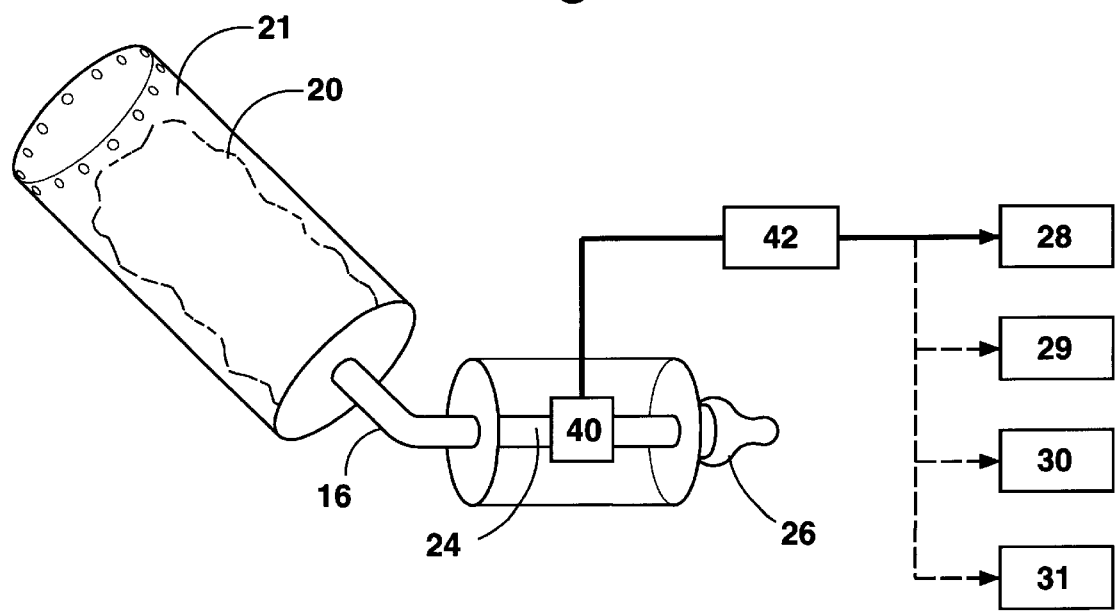
FIG. 2 shows the invention in the flow-sensing process.

The flow measurement embodiment is shown in FIG. 2. Liquid or semi-liquid from reservoir 21 passes through a fast-responding flowmeter 40. The flowmeter output is connected to a signal conditioner and rate indicator 42, which provides at its output an electrical signal proportional to the flow rate. Said signal may be recorded or displayed at devices such as (but not limited to): chart recorder 28, analog/digital converter 29, data recorder 30, or computer or other data storage or processing device 31. From a combination of flow rate and elapsed time, the total amount of liquid dispensed can be calculated and displayed. The use of flowmeters, signal conditioners, rate indicators, recorders, ADCs and similar devices to sense and record liquid flow is well known to those skilled in the art.

Figure 3:
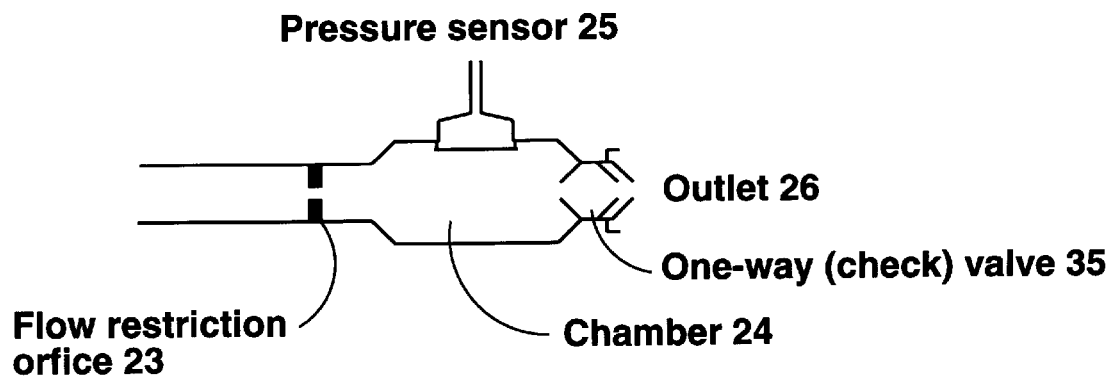
FIG. 3 shows the details of the pressure sensing embodiment including a one-way check valve at the outlet.

FIG. 3 shows that both main embodiments of this invention may be fitted with a one-way check valve 35. This valve improves the accuracy of measurements by preventing entry of air into the chamber, thus avoiding "air lock" or other artifacts at the transducer.

Figure 4:
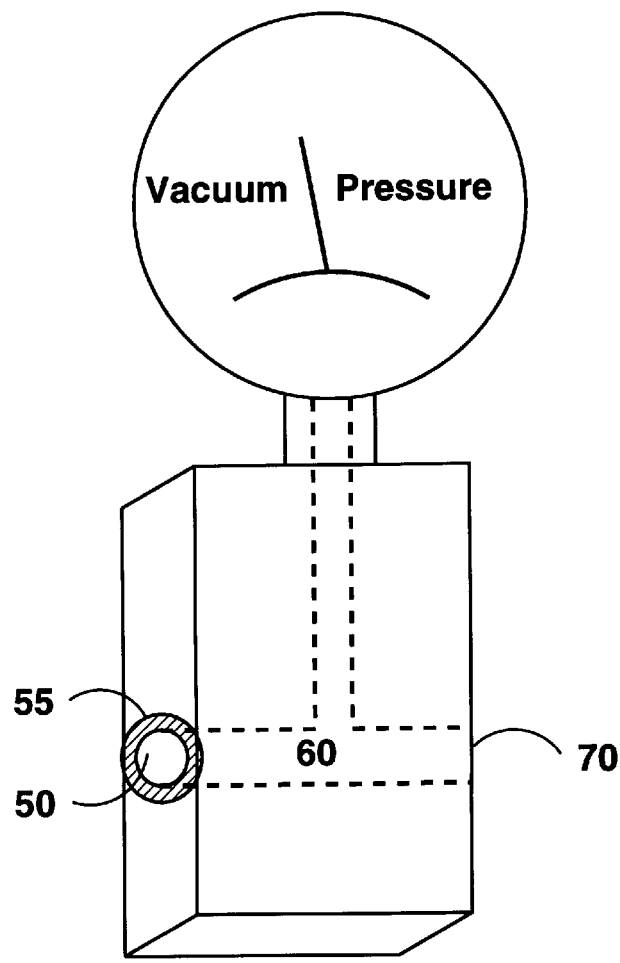
FIG. 4 shows a calibration device.

FIG. 4 shows a simple calibration device consisting of an inlet 50 which attaches with an air-tight seal 55 to the outlet of the feeding monitor, connecting by means of an airtight internal "T"-shaped passage 60 to a standard factory-calibrated vacuum gauge 65, and an outlet 70.

Figure 5:
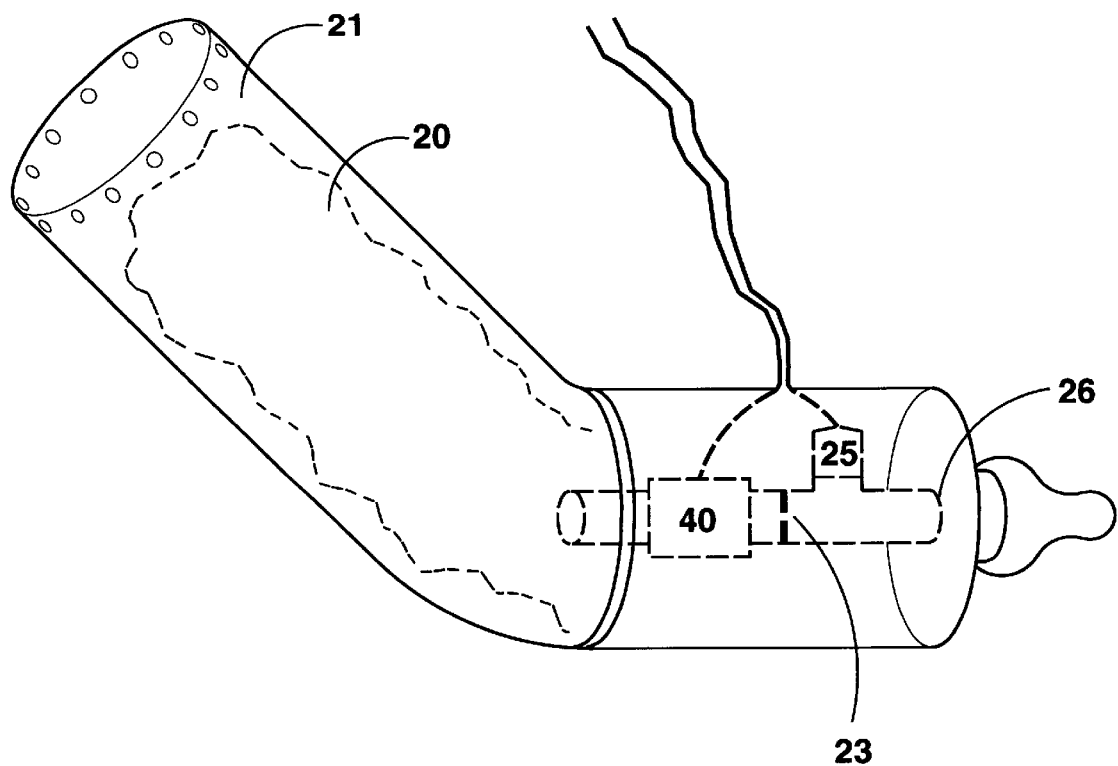
FIG. 5 shows the flow- and pressure-sensing embodiments of the invention combined and miniaturized into a single unit for monitoring human infant feeding.

FIG. 5 shows the flow- and pressure-sensing embodiments of the invention combined and em miniaturized into a single unit for monitoring human infant feeding. A variety of differing specialized units can also be made which are adapted to the monitoring of feeding and drinking in geriatric patients; monitoring of persons with chronic illness; diagnosis of disease or disability; screening for disease or disability; monitoring in animal husbandry; biomedical research; and so forth.

Operation

Before use, the system is primed-fluid is drawn through the device using a breast pump or other suction producer until the chamber is full. Feeding/drinking occurs when the infant or organism under study sucks at the outlet. In the pressure-sensing embodiment, since outlet 26 is large in comparison to flow restriction orifice 23, a pressure differential is easily created in the chamber between restriction orifice and outlet; variations in pressure during feeding are captured in real-time by pressure sensor 25. The output of the sensor (which correlates with feeding/drinking activity) is amplified or conditioned, and data generated by the device can be stored, transmitted, or displayed as desired.

The one-way check valve 35 in FIG. 3 improves the accuracy of measurements by preventing entry of air into the chamber, thus avoiding "air lock" or other artifact at the transducer.

The pressure sensor should be calibrated at least once before use. One method of calibration is to attach inlet 50 of the calibration gauge in FIG. 4 to the feeding monitor outlet. A constant vacuum is applied to the calibration gauge at its outlet 70, and the pressure reading of gauge 65 is used to calibrate the output devices of FIGS. 1 and 2: chart recorder 28, analog/digital converter 29, data recorder 30, or computer or other data storage or processing device 31.

During use, the organism under study drinks from the monitor; e.g., in the case of an infant feeding, the infant would suck normally on a nipple covering the feeding device monitor outlet. As the organism feeds, associated pressure changes are recorded and displayed on any of the previously mentioned output devices.

Operation is similar for the flowmeter embodiment; organism under study drinks from the monitor, while changes in flow are recorded and displayed as required. Recording and display of data can be performed in real-time, subject to response-time limitations of the flowmeter.

Additional Embodiments and Ramifications

The concepts of the present invention can be applied to design a monitoring system that employs a venturi as its flow restriction device; a system that uses two or more pressure sensors to measure differential pressures; or a system that includes two or more pressure sensors to measure differential pressure and calculate flow rate from the integral of said differential pressures.

The concepts of the present invention further include use of radio, infrared, or other means of wireless signal transmission to transmit pressure or flow data to a remote receiver, for example, a parent in another room, or a nurse down the hall in hospital. Indeed, using modem cellular telephone, low-altitude satellite and other messaging technologies, the monitoring data can be transmitted to a physician or other person anywhere on the planet in nearly real time.

Having illustrated and described the principles of our invention in preferred embodiments thereof, it should be readily apparent to those skilled in the art that the invention can be modified in arrangement and detail without departing from such principles. We claim all modifications coming within the spirit and scope of the accompanying claims.

What is claimed is:

1. An infant feeding monitor system comprising:
   a reservoir (21) for storing a supply of a fluid denser than air;
   a hollow chamber (24) having first and second open ends to allow the fluid to pass therethrough in use, the first end connected to the reservoir so as to receive the fluid;
   an outlet (26) connected to the second end of the chamber to allow the fluid to flow through the outlet responsive to a vacuum force applied to the outlet;
   flow restriction means interposed between the reservoir and the chamber to restrict flow of the fluid from the reservoir into the first end of the chamber; and
   a pressure sensor (25) coupled to the chamber for monitoring pressure within the chamber.

2. An infant feeding monitor system according to claim 1 wherein the reservoir includes an internal collapsible bag (20) for storing the fluid, thereby allowing the fluid to be drawn out of the reservoir and into the chamber without introducing air into the fluid.

3. An infant feeding monitor system according to claim 1 wherein the reservoir is formed of a rigid material, a first end of the reservoir being connected to communicate with the first end of a the chamber, and further including a gas permeable membrane arranged in a second end of the reservoir allowing the passage of air into the reservoir; but preventing the leakage of fluid thereby allowing the fluid to flow out of the first end of the reservoir and into the chamber responsive to the vacuum force applied at the outlet.

4. An infant feeding monitor system according to claim 1 further including:
   a connecting tube or passageway (16) connected in between the reservoir and the chamber so that fluid drawn from the reservoir flows through the connecting tube into the chamber; and
   wherein the flow restriction means (23) is disposed in the connecting tube or passageway for restricting flow of the fluid into the chamber.

5. An infant feeding monitor system according to claim 4 wherein the flow restriction means is integrally formed within the connecting tube or passageway.

6. An infant feeding monitor system according to claim 1 and farther including an amplifier (27) connected to the pressure sensor to amplify electronic signals provided by the pressure sensor responsive to pressure in the chamber, so as to form output signals.

7. An infant feeding monitor system according to claim 6 and further including apparatus for displaying the output signals on a visual display.

8. An infant feeding monitor system according to claim 6 and further including apparatus for storing the output signals.

9. An infant feeding monitor system according to claim 8 wherein the storing apparatus includes a digital computer.

10. An infant feeding monitor system comprising:

a reservoir (21) for storing a supply of a fluid denser than air;

a hollow chamber (24) having first and second open ends to allow the fluid to pass therethrough in use, the first end connected to the reservoir so as to receive the fluid;

an outlet (26) connected to the second end of the chamber to allow the fluid to flow through the outlet responsive to a vacuum force applied to the outlet; and a flow meter (40) coupled to the chamber for monitoring the rate of flow through the chamber.

11. An infant feeding monitor system according to claim 10 wherein the reservoir includes an internal collapsible bag (20) for storing the fluid, thereby allowing the fluid to be drawn out of the reservoir and into the chamber without introducing air into the fluid.

12. An infant feeding monitor system according to claim 10 wherein the reservoir is formed of a rigid material, a first end of the reservoir being connected to communicate with the first end of the chamber, and further including a gas permeable membrane arranged in the opposite end of the reservoir so as to allow air to be drawn into the reservoir, thereby allowing the fluid to flow out of the first end of the reservoir and into the chamber responsive to the vacuum force applied at the outlet.

13. An infant feeding monitor system according to claim 10 and further including:

a connecting tube or passageway (16) connected between the reservoir and the chamber so that fluid drawn from the reservoir flows through the connecting tube or passageway into the chamber.

14. An infant feeding monitor system according to claim 10 and further including a rate indicator (42) connected to the flow meter to condition electronic signals provided by the flow meter responsive to fluid flow through the chamber, so as to form output signals.

15. An infant feeding monitor system according to claim 14 and further including an apparatus for displaying the output signals on a visual display.

16. An infant feeding monitor system according to 14 and further including apparatus for storing the output signals.

17. An infant feeding monitor system according to claim 16 wherein the storing apparatus includes a digital computer.

18. A method for monitoring feeding comprising the steps of:

providing a reservoir containing a supply of a feeding fluid to feed a subject;

arranging a chamber between the reservoir and the subject so that the feeding fluid flows through the chamber in response to sucking pressure applied by the subject while ingesting the feeding fluid; and monitoring pressure in the chamber while the subject ingests the feeding fluid.

19. An infant feeding monitor system according to claim 17, which calculates and displays the total amount of fluid dispensed.

20. A method for monitoring feeding comprising the steps of:

providing a reservoir containing a supply of a feeding fluid to feed a subject;

arranging a chamber between the reservoir and the subject so that the feeding fluid flows through the chamber in response to sucking pressure applied by the subject while ingesting the feeding fluid; and monitoring fluid flow through the chamber while the subject ingests the feeding fluid.

* * * * *